United States Patent [19]  [11] 4,019,773
Vehling  [45] Apr. 26, 1977

[54] MOBILE CARPET DISPLAY CENTER
[76] Inventor: Floyd W. Vehling, 7234 E. Coronado Road, Scottsdale, Ariz. 85257
[22] Filed: Jan. 5, 1976
[21] Appl. No.: 646,847
[52] U.S. Cl. .................................. 296/21; 312/38
[51] Int. Cl.² ........................................ B60P 3/02
[58] Field of Search ............ 296/21, 62, 22; 312/38
[56] References Cited
UNITED STATES PATENTS

| 1,327,248 | 1/1920 | Moody | 296/62 |
|---|---|---|---|
| 1,617,940 | 2/1927 | Chase | 296/21 |
| 3,323,848 | 6/1967 | Bahnsen | 312/38 |

FOREIGN PATENTS OR APPLICATIONS

| 1,075,812 | 4/1954 | France | 296/21 |
|---|---|---|---|
| 117,246 | 10/1926 | Switzerland | 296/21 |

Primary Examiner—Philip Goodman
Attorney, Agent, or Firm—Warren F. B. Lindsley

[57] ABSTRACT

A mobile trailer structure designed, constructed and equipped to provide a completely self-contained facility for the retail promotion and selling of carpets and similar merchandise.

2 Claims, 8 Drawing Figures

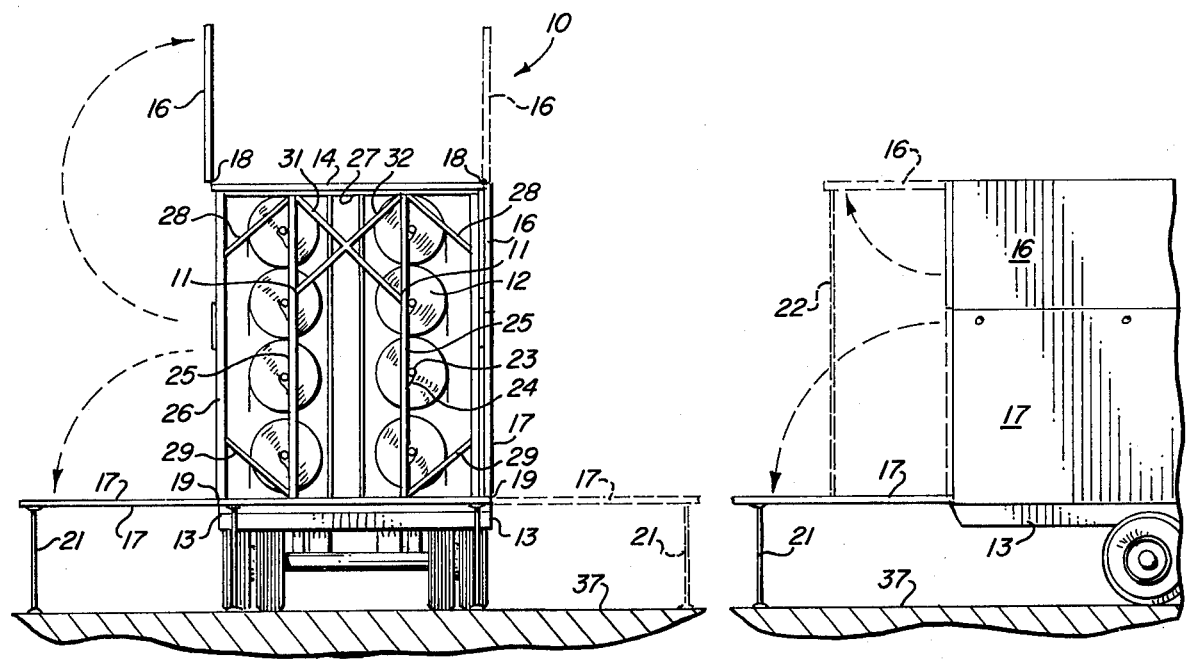
FIG-4
FIG-5
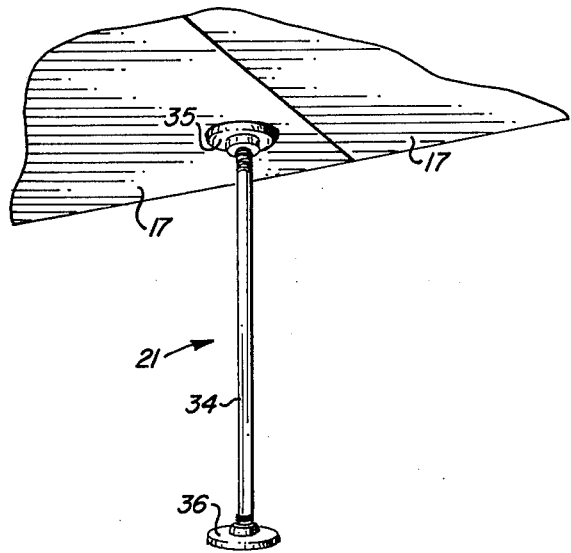
FIG-6
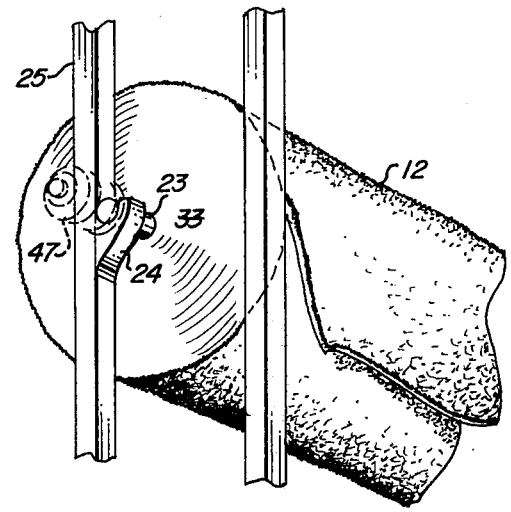
FIG-7
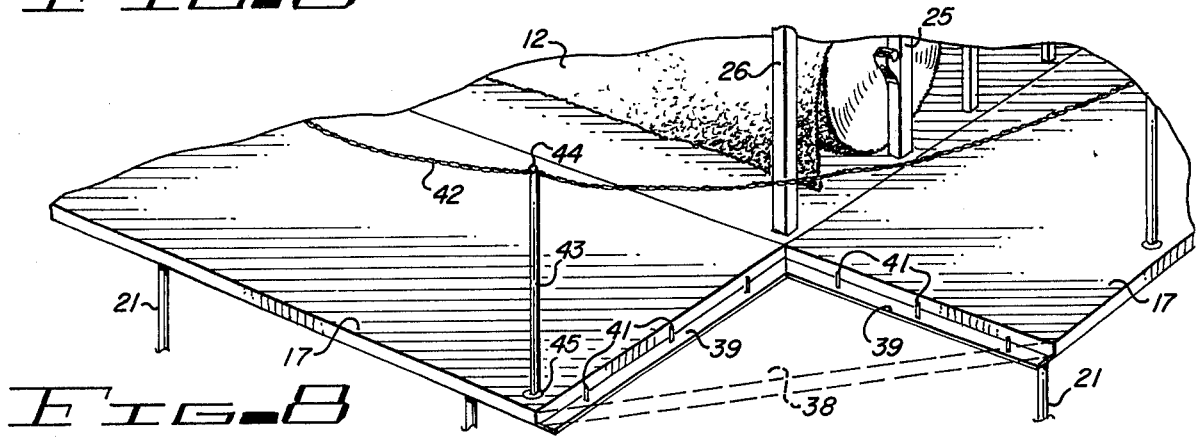
FIG-8

MOBILE CARPET DISPLAY CENTER

BACKGROUND OF THE INVENTION

In recent years, the central shopping areas of most cities have given way to neighborhood shopping centers. As a result, a retailer of a specialized product finds he must establish stores at a number of different locations if he is to serve a wide area. This is an expensive proposition in terms of both capital and operating expense.

The problem is not so serious in the case of restaurants, drug stores, clothing stores and the like which may be visited frequently by the same clientele. There are other types of businesses, however, which are not ordinarily visited by a customer or a prospective customer any more frequently than once or twice a year. An example of such a business is a carpet store.

For this reason a carpet store must of economic necessity serve a wider geographical area than a drug store or a clothing store and the customers are forced to drive greater distances or limit themselves to shopping in only a very limited number of competitive establishments.

In remote communities carpet stores will be many miles apart and the local populace will have to travel great distances to buy carpeting. Then, unless a buyer is willing to make a second or third trip he is forced to make a quick decision without having had the benefit of taking samples home for better examination and for comparison of color and fabric with other furnishings.

For these and other reasons there is a need for a mobile carpet distributing center which may be moved from one location to another spending perhaps one day and one night in each of several locations on a weekly or monthly schedule. Such a mobile carpet store would offer a number of advantages: It would afford the retailer a means for realizing wide geographical coverage without the expense involved in maintaining several stores. It would at the same time provide a convenience to the customer by reducing the distance and time spent in travel. Finally, an overall economy would be realized in terms of the conservation of motor fuel as well as in a reduction of congestion on city streets.

SUMMARY OF THE INVENTION

It is therefore one object of this invention to provide a mobile store for the display and selling of carpets.

Another object of this invention is to provide such a mobile store in the form of a convertible structure having a moving mode and a selling or dispensing mode.

A further object of this invention is to provide in such a convertible structure a capability for quick and easy conversion from one mode to the other and back again.

A still further object of this invention is to insure that in the moving mode the structure will be compact and rugged to enable compliance with dimensional and weight limits as established by governmental authorities and also to permit its being moved without difficulty from site to site.

Yet another object of this invention is to insure that in its selling or dispensing mode the structure will provide comfort, safety and convenience to the customers and sales personnel and will be pleasing in appearance so as to attract customers and not prove an eyesore or a blight on the environment in which it is operated.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing in which:

FIG. 4 is an end view of the structure as it appears from the left-hand side of FIG. 1;

FIG. 5 is a side view of a rear portion of the structure with only one panel having been opened in a partial conversion to the selling mode;

FIG. 6 is a view of a typical support on which the hinged sides rest when they are folded down to form a floor for customers and sales personnel;

FIG. 7 is a view of a portion of the rack which supports the rolls of carpeting; and FIG. 8 is a close-up perspective view of one corner of the structure of FIG. 1;

DESCRIPTION OF THE PREFERRED EMBODIMENT

Figure 1:
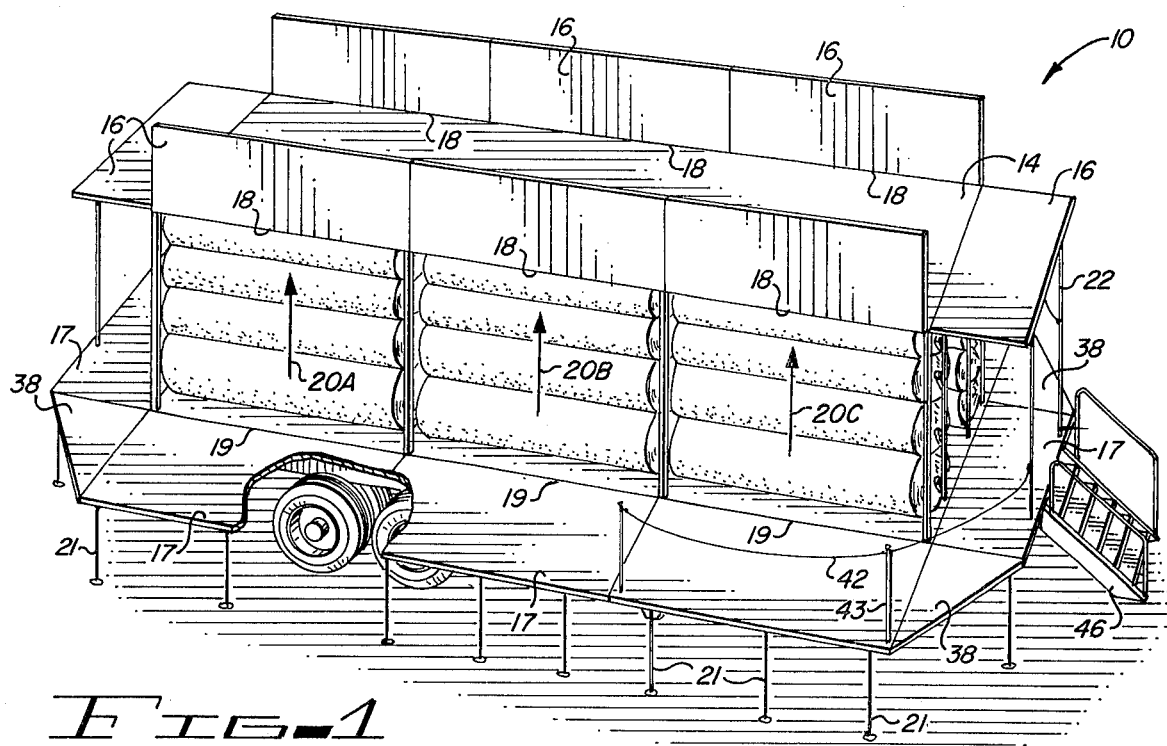
FIG. 1 is a perspective view of the mobile structure of the invention as converted to the selling or dispensing mode.

Referring more particularly to the drawing by characters of reference, FIGS. 1–8 disclose a mobile display and sales structure 10 for selling carpets or similar merchandise.

In the embodiment of FIGS. 1–8 the structure 10 comprises two racks 11 for supporting rolls of carpeting 12. The racks 11 are mounted on the bed of a conventional truck trailer 13 forming a part of the framing which supports the roof 14.

Figure 2:
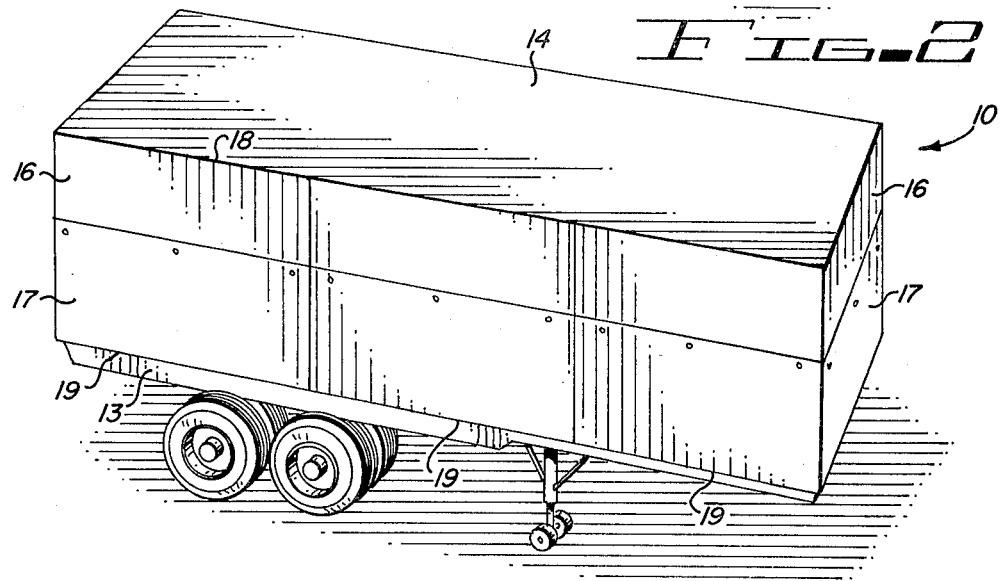
FIG. 2 is a perspective view of the mobile structure as converted to the moving mode.
Figure 3:
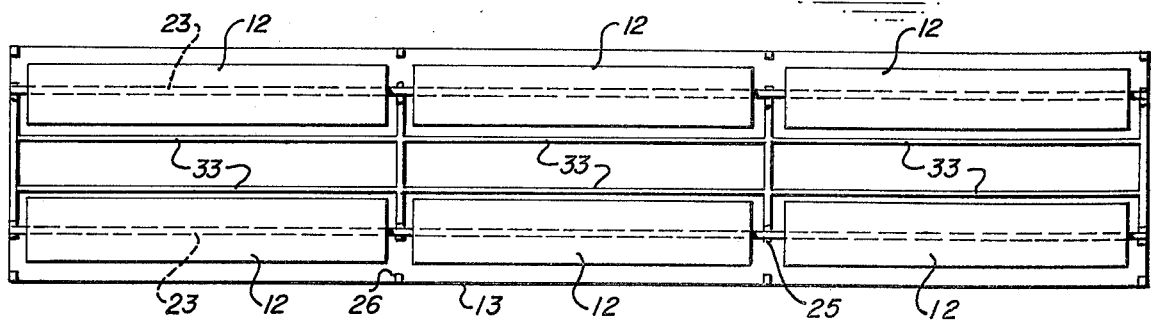
FIG. 3 is a top view of a portion of the structure including the racks which support the rolls of carpeting in both the moving and the selling modes.

The sides of the structure 10 are covered in the moving mode as shown in FIG. 2 by eight upper hinged flaps 16 and eight lower hinged flaps 17. There are three upper and three lower flaps on each side and one each at the front and at the rear. The upper flaps 16 are hinged to the roof 14 along their upper edges 18 and the lower flaps 17 are hinged to the bed of the trailer 13 along their lower edges 19.

When the structure 10 is set up for display and selling as shown in FIG. 1, the lower flaps 17 are folded down to a horizontal position, their outer edges resting on a plurality of cylindrical supports 21. The upper flaps 16 may be folded upward to a horizontal position as shown for the end flaps in FIG. 1 where they serve as a sun shade, or they may be pivoted 180° to an upright position as shown for the side flaps in FIG. 1 where their vertical outside surfaces may be used to post promotional information. Vertical struts 22 are employed to secure the horizontal position; hooks or chains of various types will be found suitable for securing the upright position.

Each of the racks 11 may support three or more vertical columns of carpet rolls 20A, 20B and 20C with four rolls of carpeting in each column. Passing through each roll of carpeting 12 is a steel rod 23 each end of which is supported by a hook 24 attached to the side of a vertical steel post 25, there being four such posts 25 provided to support the three columns 20A, 20B and 20C with one located between columns 20A and 20B, one between columns 20B and 20C, one at the rearward end of column 20A and one at the forward end of column 20C.

Along both side edges of the bed 13 there are four vertical support posts 26, one located directly outboard of each of the posts 25.

A horizontal steel bar 27 runs laterally from the top of each post 26 to the opposite post 26, the bar 27 being rigidly attached to both posts 26 and to tops of the two posts 25 which are aligned therebetween.

Between each laterally adjacent pairs of posts 25 and 26 there are two diagonal braces including an upper brace 28 and a lower brace 29. A pair of diagonal braces 31 and 32 in the form of an "X" provides support between each of the four pairs of laterally adjacent posts 25. The braces 31 and 32 are located near the tops of the posts 25.

The posts 25 and 26, the horizontal bars 27 and the braces 28, 29, 31 and 32 form four rigid frames which resist deformation by lateral forces. Additional diagonal braces 33 lying in a vertical longitudinal plane and running from roof 14 to bed 13 between longitudinally adjacent frames provide support and resistance to longitudinal stresses.

A rigid framework is thus provided by the eight vertical posts 25, eight vertical posts 26, four horizontal bars 27 and the braces 28, 29, 31, 32 and 33, said framework supporting the rolls of carpeting 12 and the roof 14 and affording lateral support as well for the side flaps 16 and 17 in their closed positions.

The supports 21 are simply constructed as shown in FIGS. 6 using a length of steel pipe 34 threaded at both ends to receive threaded disc-shaped adaptors or feet 35 and 36, the feet 35 and 36 being identical. The upper foot 35 affords a flat surface facing upward on which the flap 17 rests and the lower foot 36 has its flat surface resting on the ground or pavement.

Ideally the surface 37 on which the mobile center 10 is parked for the display and selling of carpets should be an even and level paved surface such as a street or a concrete slab placed for the specific purposes. This will insure that the folded out flaps 17 will form a flat horizontal surface which serves as the floor of the carpet display area.

A triangular plate 38 is employed at each of the four corners between the folded-down flaps 17 to complete the floor of the display area. The plates 38 are supported between flaps 17 by horizontally extending flat steel strips 39 running along the edges of flaps 17 with further security afforded by means of steel pins 41 which pass vertically through holes along the edges of plate 38 and through aligned holes in strips 39.

A safety railing in the form of a chain 42 follows the periphery of the display floor formed by the folded-down flaps 17 and the plates 38. The chain 42 is supported by steel posts 43, each of which has an open ring 44 at the top through which the chain is passed and a lower threaded end 45 which is screwed into a threaded hole in the flap 17.

A light-weight steel stairway 46 has its upper edge attached to the edge of one of the folded-down flaps 17 at any appropriate location as shown in FIG. 1 at the front end of the mobile center 10. The stairway 46 is equipped with detachable side railings so that it may be quickly disassembled and stored between the vertical columns of carpet rolls when the center 10 is moved.

As an optional feature, a low-speed direct-current motor 47 may be coupled to one of each bar 23. The motor 47 may then be operated by pressing a button to roll or unroll the carpeting for display or sale.

The procedure for setting up the center 10 on a selected site is quite simple. The flaps 17 are first lowered to their horizontal position as supports 21 are appropriately positioned to hold them level. The plates 38, chain 42 and stairway 46 are then installed. Finally, the flaps 16 are raised and secured in position and the center is ready for business.

The reverse of the foregoing procedure is followed to restore center 10, to the moving mode.

With appropriate props and routines the conversion from the moving mode to the selling mode and vice versa may be accomplished by one man in an hour or less, the same man driving the truck in moving from site-to-site, then serving as the salesman.

A simply and inexpensively constructed mobile display and sales center is thus provided in accordance with the objects of the invention. The center may be utilized to sell carpeting, yard goods or similar merchandise.

Although but a single embodiment of the present invention has been illustrated and described it will be apparent to those skilled in the art that various changes and modifications may be made therein without departing from the spirit of the invention or from the scope of the appended claims.

What is claimed is:

1. A self contained trailer for the promotion and selling of rolled merchandise such as carpet comprising:

a trailer having a wheel mounted trailer bed, a roof spaced from and mounted on said bed by substantially vertically positioned posts, and side and end members, each of said side and end members comprising a plurality of flaps part of which are hingedly mounted adjacent the edges of said bed and the remainder hingedly mounted adjacent the edges of said roof, whereby when said flaps are rotated to a substantially vertical position said flaps cooperatively enclose the sides and ends of the trailer, means for supporting said part of said flaps in a horizontal position when these flaps are rotated to a horizontal position to form a walk around the sides and ends of said bed, a pair of racks each mounted longitudinally of the bed and each adjacent a different edge of said bed within the trailer for supporting longitudinally of the bed a plurality of substantially horizontally positioned rolls of merchandise, said racks being spaced from each other to provide a walk space therebetween, each of said racks comprises at least a pair of sections axially aligned and each section mounting in a vertical array a plurality of substantially horizontally positioned rolls of merchandise, mounting means comprising a hook-shaped configuration opening upwardly toward said roof provided on each of said sections of said pairs of racks for rotatively supporting and mounting the rolls of merchandise, motor means mountable on each of said racks for rotating said rolls of merchandise, and step means hingedly mounted to an edge of a flap hingedly mounted to one end of said truck bed for pivotal movement away from said truck bed for resting on the ground to provide steps for ascending to the walk around the truck bed, and when pivotally rotated in the opposite direction moving into said walk space for storage purposes.

2. The self contained trailer set forth in claim 1 wherein:
said flaps when rotated to a substantially vertical position cooperatively engage in butting arrangement to form a plane surface on the sides and ends of the trailer.

* * * * *